US008494438B2

(12) United States Patent
Jung et al.

(10) Patent No.: US 8,494,438 B2
(45) Date of Patent: Jul. 23, 2013

(54) METHOD AND SYSTEM FOR SHARING SERVICE GUIDE OR SERVICE GUIDE FRAGMENTS IN MOBILE BROADCAST SYSTEM

(75) Inventors: Bo-Sun Jung, Seoul (KR); Sung-Oh Hwang, Seoul (KR); Jong-Hyo Lee, Gyeonggi-do (KR); Kook-Heui Lee, Gyeonggi-do (KR); Byung-Rae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/194,272

(22) Filed: Jul. 29, 2011

(65) Prior Publication Data

US 2011/0283303 A1 Nov. 17, 2011

Related U.S. Application Data

(62) Division of application No. 11/702,339, filed on Feb. 5, 2007, now abandoned.

(30) Foreign Application Priority Data

Feb. 3, 2006 (KR) ................................ 2006-10388

(51) Int. Cl.
*H04H 20/71* (2008.01)
*H04H 40/00* (2008.01)
*H04N 7/16* (2011.01)

(52) U.S. Cl.
USPC .............. 455/3.01; 455/3.06; 725/39; 725/62

(58) Field of Classification Search
USPC ................ 455/414.1–414.4, 405, 406, 422.1, 455/427, 12.1, 3.01–3.06; 370/351–356, 370/310.2, 328, 338; 725/39, 62, 63, 56, 725/57, 87, 101, 73, 74, 104–106, 135
See application file for complete search history.

(56) References Cited

U.S. PATENT DOCUMENTS

| | | | | |
|---|---|---|---|---|
| 7,865,171 | B2 * | 1/2011 | Karlsson | 455/408 |
| 7,995,506 | B2 * | 8/2011 | Kalish | 370/310 |
| 2002/0053082 | A1 | 5/2002 | Weaver et al. | |

(Continued)

FOREIGN PATENT DOCUMENTS

| | | |
|---|---|---|
| JP | 2002-041825 | 2/2002 |
| JP | 2004-040770 | 2/2004 |

(Continued)

OTHER PUBLICATIONS

OMA: "Mobile Broadcast Services Architecture", Draft Version 1.0, Dec. 1, 2004.

(Continued)

*Primary Examiner* — San Htun
(74) *Attorney, Agent, or Firm* — The Farrell Law Firm, P.C.

(57) ABSTRACT

A method and system is provided for sharing a service guide or a service guide fragment in a mobile broadcast system supporting a mobile broadcast service. A Broadcast Service Provisioning Client Function (BSP-C) sends a request for the service guide or service guide fragment to a Broadcast Service Provisioning Management Function (BSP-M). The BSP-M transmits the service guide or service guide fragment to the BSP-C if the BSP-M has the service guide or service guide fragment.

10 Claims, 8 Drawing Sheets

U.S. PATENT DOCUMENTS

| | | | |
|---|---|---|---|
| 2003/0194992 | A1 | 10/2003 | Kim et al. |
| 2005/0043020 | A1 | 2/2005 | Lipsanen et al. |
| 2005/0090235 | A1 * | 4/2005 | Vermola et al. ............ 455/414.3 |
| 2006/0053450 | A1 * | 3/2006 | Saarikivi et al. ................ 725/46 |
| 2006/0189300 | A1 | 8/2006 | Hwang et al. |
| 2006/0225093 | A1 | 10/2006 | Huttunen et al. |
| 2007/0072543 | A1 * | 3/2007 | Paila et al. ................... 455/3.06 |
| 2007/0100984 | A1 * | 5/2007 | Jansky et al. ................. 709/223 |
| 2009/0185522 | A1 | 7/2009 | Periyalwar et al. |

FOREIGN PATENT DOCUMENTS

| | | |
|---|---|---|
| JP | 2005-032332 | 2/2005 |
| KR | 1020030008681 | 1/2003 |
| KR | 1020050014599 | 2/2005 |
| WO | WO 2004/042972 | 5/2004 |
| WO | WO 2005/015776 | 2/2005 |

OTHER PUBLICATIONS

"Mobile Broadcast Services Architecture", Draft Version 1.0, OMA_AD_BCAST_V1_0-20050420-D, Apr. 20, 2005.

* cited by examiner

METHOD AND SYSTEM FOR SHARING SERVICE GUIDE OR SERVICE GUIDE FRAGMENTS IN MOBILE BROADCAST SYSTEM

PRIORITY

This application is a Divisional Application of U.S. patent application Ser. No. 11/702,339 filed in the U.S. Patent and Trademark Office on Feb. 5, 2007 and this application claims priority under 35 U.S.C. §119(a) to an application filed in the Korean Intellectual Property Office on Feb. 3, 2006 and assigned Serial No. 2006-10388, the contents of which are hereby incorporated by reference.

BACKGROUND OF THE INVENTION

1. Field of the Invention

The present invention relates generally to a mobile broadcast system, and in particular, to a method and system for sharing a service guide or service guide fragments in a mobile broadcast system.

2. Description of the Related Art

The mobile communication market constantly faces the need for production of new services through recombination or integration of the existing technologies. Today, due to the development of communication and broadcast technologies, the conventional broadcast system or mobile communication system has reached the phase of providing broadcast services through portable terminals (mobile terminals) such as mobile phone, Personal Digital Assistant (PDA), and the like. Convergence of mobile communication service and Internet protocol (IP) is now the mainstream of the next generation mobile communication technology in harmony between the latent market needs, the increasing user demand for multimedia services, the strategy of the service providers for providing new services like the broadcast service in addition to the existing voice service, and the interests of the Information Technology (IT) companies that are reinforcing their mobile communication business to meet the user demands.

Open Mobile Alliance (OMA), which is a group for studying the standard for interworking between individual mobile solutions, mainly takes is a leader in establishing various application standards for mobile games, Internet services, and the like. In particular, OMA BAC (Brower and Content) BCAST (Mobile Broadcast Sub Working Group), one of the OMA working groups, is studying the technology for providing broadcast services using mobile terminals.

In the mobile broadcast system, a mobile terminal for receiving a broadcast service should receive service guide information including description information of the service itself, charging information for the service, and information on a reception method of the service. The mobile terminal receives a corresponding service using the service guide information.

Although a description of the existing technology and the present invention will be made herein with reference to the OMA BCAST technology, which is one of the mobile broadcast technology standards, by way of example, this is not intended to limit the present invention.

FIG. 1 illustrates exemplary architecture of a general mobile broadcast system for delivering a service guide to a mobile terminal. Table 1 and Table 2 show interfaces used between logical entities of FIG. 1.

TABLE 1

| Interface Name | Description |
|---|---|
| SG1(103) | Server-to-server communications for delivering content attributes such as description information, location information, target terminal capabilities, target user profile, etc., in the form of BCAST service guide fragments; or in a proprietary format. |
| SG2(106) | Server-to-server communications for delivering BCAST service attributes such as service/content description information, scheduling information, location information target terminal capabilities, target user profile, etc., in the form of BCAST service guide fragments. |
| SG-B1(116) | Server-to-server communications for either delivering BDS specific attributes from BDS BCAST Service Guide Adaptation function, to assist Service Guide adaptation to specific BDS, or to deliver BCAST Service Guide attributes to BDS for BDS specific adaptation and distribution. |
| SG4(115) | Server-to server communications for delivering provisioning information, purchase information, subscription information, promotional information, etc., in the form of BCSAT service guide fragments. |
| SG5(117) | Delivery of BCAST Service Guide through Broadcast Channel, over IP. |
| SG6(118) | Delivery of BCAST Service Guide through Interaction Channel. Interactive access to related Service Guide or additional information related to Service Guide, for example, HTTP, SMS, or MMS. |

TABLE 2

| Interface Name | Description |
|---|---|
| X-1(124) | Reference Point between BDS Service Distribution and BDS |
| X-2(125) | Reference Point between BDS Service Distribution and Interaction Network |
| X-3(126) | Reference Point between BDS and Terminal |
| X-4(127) | Reference Point between BDS Service Distribution and terminal over Broadcast Channel |
| X-5(128) | Reference Point between BDS Service Distribution and terminal over Broadcast Channel |
| X-6(129) | Reference Point between Interaction Network and Terminal |

Referring to FIG. 1, a Content Creation (CC) block 101 is a provider of a broadcast service (hereinafter referred to as "BCAST service"), and the BCAST service can include the conventional audio/video broadcast service, file (music file or data file) download service, and the like. With use of a Service Guide Content Creation Source (SGCCS) block 102, the Content Creation 101 delivers content information, capability information of a mobile terminal, user profile, content time information, etc., needed for the generation of a service guide for the BCAST service, to a Service Guide Application Source (SGAS) block 105 of a BCAST Service Application (BSA) block 104 via an SG-1 interface 103, defined in Table 1.

The BCAST Service Application block 104 takes charge of generating BCAST service data by processing data of BCAST service provided from the Content Creation block 101 into the form suitable for a BCAST network. In addition, the BCAST Service Application block 104 takes charge of generating standardized metadata necessary for the mobile broadcast guide.

The SGAS block 105 delivers various sources necessary for the generation of a service guide, such as service/content detail information, schedule information, location information, etc., including the information provided from the SGCCS block 102, to a Service Guide Generation (SG-G)

block 109 of a BCAST Service Distribution/Adaptation block 108 via an SG-2 interface 106.

The BCAST Service Distribution/Adaptation (BSD/A) block 108 takes charge of setting up a bearer over which it will transmit the BCAST service data provided from the BCAST Service Application block 104, determining transmission schedules of the BCAST services, and generating mobile broadcast guide information. The BCAST Service Distribution/Adaptation block 108 is connected to a Broadcast Distribution System (BDS) 122, which is a network for transmitting BCAST service data, and an Interaction Network 123 supporting interaction communication.

A service guide generated by the SG-G block 109 is delivered to a Terminal (or mobile terminal) 119 via an SG Distribution (SG-D) block 110 and an SG-5 interface 117. If there is a need for delivering a service guide via the BDS 122 or the Interaction Network 123 supporting interaction communication, or for matching with a corresponding system or network, the service guide generated by the SG-G block 109 is matched by a SG Adaptation (SG-A) block 111 and then delivered to the SG-D block 110 or delivered to a BDS Service Distribution block 121 via an SG-B1 interface 116.

A BCAST Subscription Management (BSM) block 113 manages subscription information and service provisioning information for receipt of the BCAST service, and device information for a mobile terminal receiving the BCAST service. A Service Guide Subscription Source (SGSS) block 114 of the BCAST Subscription Management block 113 delivers sources, such as a subscription/provisioning related source, purchase information, promotional information, etc., needed for the generating of a service guide, to the SG-G block 109 for generating a service guide, via an SG-4 interface 115.

The BDS Service Distribution block 121 takes charge of distributing all received BCAST services through a broadcast channel or an interaction channel, and is an entity, the presence of which depends on a type of the BDS 122. The BDS 122 is a network for transmitting the BCAST service, and can be a broadcast network for, for example, Digital Video Broadcasting—Handheld (DVB-H), 3GPP Multimedia Broadcast and Multicast Services (MBMS), and 3GPP2 Broadcast and Multicast Services (BCMCS). The Interaction Network 123 transmits the BCAST service on a point-to-point basis, or interactively exchanges control information and additional information related to the receipt of the BCAST service, and can be, for example, the existing cellular network.

The Terminal 119 is an apparatus capable of receiving the BCAST service, and has a function capable of connecting with the cellular network according to terminal capability. The Terminal 119, including a Service Guide Client (SG-C) 120, receives a service guide transmitted via the SG-5 interface 117, or receives a service guide transmitted via an SG-6 interface 118, and performs an appropriate operation for the BCAST service reception.

In the mobile broadcast system, the SG-G 109 receives information required to generate a service guide, provided from the CC 101, the BSA 104 and the BSM 113. With use of the provided information, the SG-G 109 generates a final service guide based on the data model described in FIG. 1.

SUMMARY OF THE INVENTION

Although information on the service guide is a response to a request for service guide-related information, sent from the mobile terminal to the BSM 113, the BSA 104 needs final information on the service guide generated in the same way by the BSM 113 and the BSA 104, as basic information for generation of charging information for the service. For this, there is a need for a method in which the BSD/A 108 can provide a service guide generated therein to the BSM 113 and the BSA 104, or the BSM 113 or the BSA 104 can send a request for service guide information to the BSD/A 108 when necessary, and receive the corresponding information therefrom. In addition, in a service provisioning process, if the BSM 113 needs to provide service guide fragments for associated purchase information upon receipt of a request for price information from the mobile terminal, the BSM 113 should be able to directly transmit the corresponding information to the mobile terminal, or receive the corresponding information from the BSD/A 108 and transmit the received information to the mobile terminal.

An aspect of the present invention is to address at least the problems and/or disadvantages set forth above and to provide at least the advantages described below. Accordingly, an aspect of the present invention is to provide a service guide or service guide fragment sharing method and system for providing a service guide generated between network entities for a mobile broadcast service in a network, and providing information on a requested service guide, in a service guide that provides schedule information for service/content, access method information, price information, and purchase method information to the mobile terminal in a mobile broadcast system.

Another aspect of the present invention is to provide a service guide or service guide fragment sharing method and system for providing price information or its associated service guide information to a mobile terminal according to a sharing method between entities for a service guide in response to a price request for a purchase item from the mobile terminal.

According to one aspect of the present invention, there is provided a method for sharing a service guide or a service guide fragment in a mobile broadcast system supporting a mobile broadcast service. The method includes a Broadcast Service Provisioning Client Function (BSP-C) sending a request for the service guide or service guide fragment to a Broadcast Service Provisioning Management Function (BSP-M); and the BSP-M transmitting the service guide or service guide fragment to the BSP-C the BSP-M it has the service guide or service guide fragment.

According to another aspect of the present invention, there is provided a system for sharing a service guide or a service guide fragment in a mobile broadcast system supporting a mobile broadcast service. The system includes a Broadcast Service Provisioning Client Function (BSP-C) for sending a request for the service guide or service guide fragment to a Broadcast Service Provisioning Management Function (BSP-M); and the BSP-M for transmitting the service guide or service guide fragment to the BSP-C if the BSP-M has the service guide or service guide fragment.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

For convenience, a description of the present invention will be made herein using the names of the entities defined in the 3rd Generation Partnership Project (3GPP), which is the asynchronous mobile communication standard, or defined in the BCAST of Open Mobile Alliance (OMA), which is a standard group for the application of a mobile terminal. However, the stated standards and entity names thereof are not intended to limit the scope of the present invention, and the present invention can be applied to any system having similar technical structures.

Figure 2:
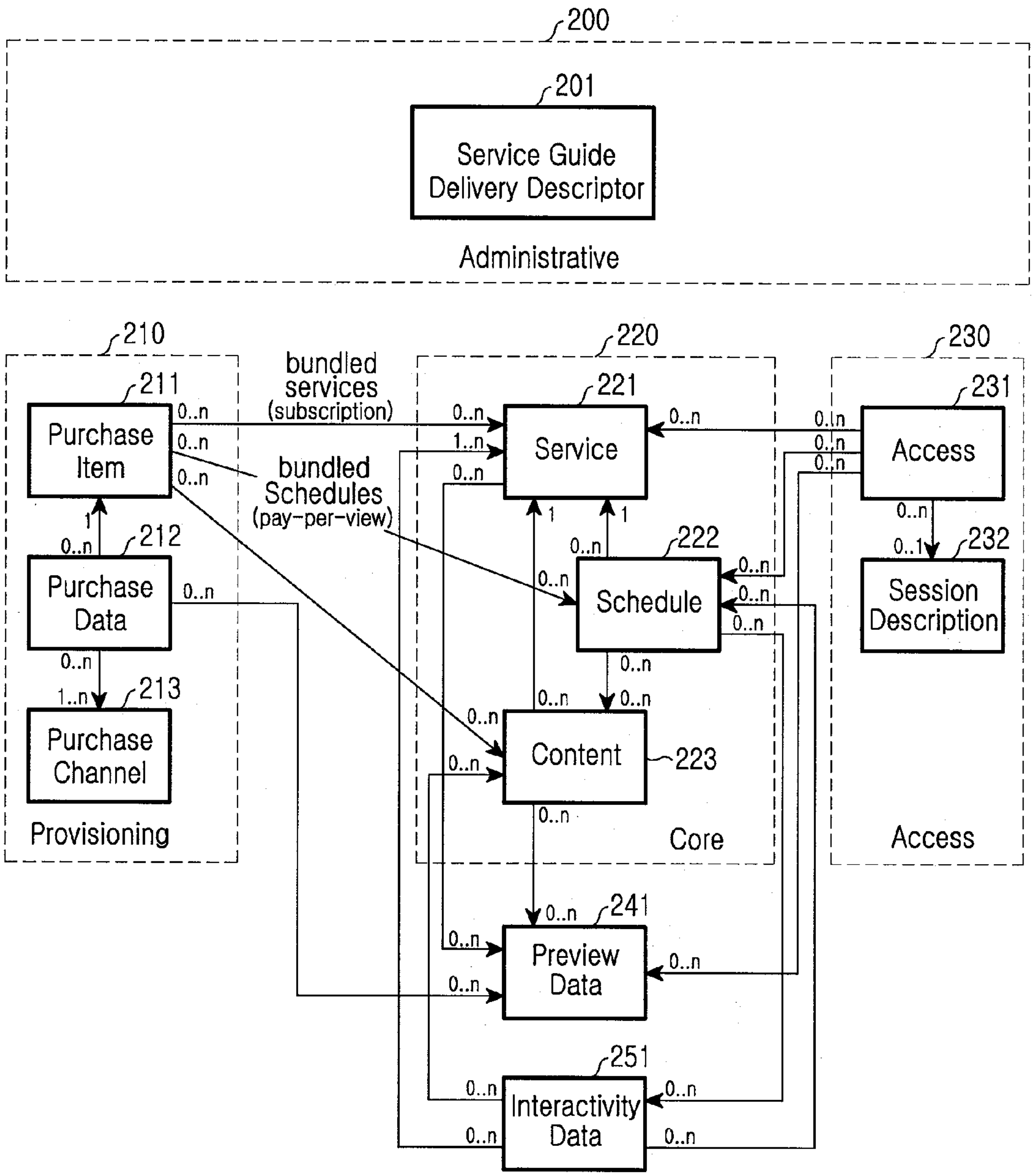
FIG. 2 is a diagram illustrating a data model for a service guide in OMA BCAST to which the present invention is applicable.

FIG. 2 is a diagram illustrating a format of a service guide used for receiving a broadcast service in a mobile broadcast system to which the present invention is applicable. FIG. 2 illustrates a data model of a service guide proposed for providing a broadcast service to a mobile terminal in the OMA BAC BCAST. One service guide includes fragments having their own usages, and the fragments are divided into 4 groups according to its usage.

Referring to FIG. 2, the service guide includes an Administrative Group 200 for providing upper configuration information of the entire service guide, a Provisioning Group 210 for providing subscription and purchase information of the service, a Core Group 220 for providing core information of the service guide, such as service/content and service schedule, and an Access Group 230 for providing access information for accessing the service/content. In FIG. 2, a solid line connected between fragments illustrates a cross reference between the fragments.

The Administrative Group 200, a group for providing basic information needed by a Terminal to receive the service guide, includes a Service Guide Delivery Descriptor (SGDD) 201. The Service Guide Delivery Descriptor 201 provides information on a delivery session where a Service Guide Delivery Unit (SGDU) (not shown) containing fragments, which are unit elements constituting the service guide, is located, and provides an Entry Point used for receiving Grouping information for SGDU and a Notification message.

The Provisioning Group 210 is a group for providing charging information for service reception. The Provisioning Group 210 includes a Purchase Item fragment 211, a Purchase Data fragment 212, and a Purchase Channel fragment 213. The Purchase Item fragment 211 provides bundles of service, content and time to help the user subscribe to or purchase the corresponding purchase item. The Purchase Data fragment 212 includes detailed purchase and subscription information such as price information and promotion information for services or service bundles. The Purchase Channel fragment 213 provides access information for subscription or purchase.

The Core Group 220 is a group for providing information on the service itself. The Core Group 220 includes a Service fragment 221, a Schedule fragment 222, and a Content fragment 223. The Service fragment 221 is an upper aggregate of contents included in a broadcast service, as a core of the entire service guide, and provides service content, genre, service location information. The Schedule fragment 222 provides time information of the contents included in the service, such as Streaming, Downloading, etc. The Content fragment 223 provides detailed description, target user group, service area, and genre information for the broadcast content.

The Access Group 230 includes an Access fragment 231 and a Session Description fragment 232. The Access fragment 231 provides access-related information to allow the user to access the service, and also provides delivery method and session information for the corresponding access session. The Session Description fragment 232 can be included in the Access fragment 231, and can provide location information in a Uniform Resource Identifier (URI) format, so the Terminal can detect the corresponding Session Description information. In addition, the Session Description fragment 232 provides address information and codec information for the multimedia content existing in the corresponding session.

The service guide information can further include a Preview data fragment 241 and an Interactivity Data fragment 251 for providing previews and icons for the service/content, in addition to the above 4 groups. In this way, the unit elements constituting the service guide are referred to as 'fragments.'

Figure 1:
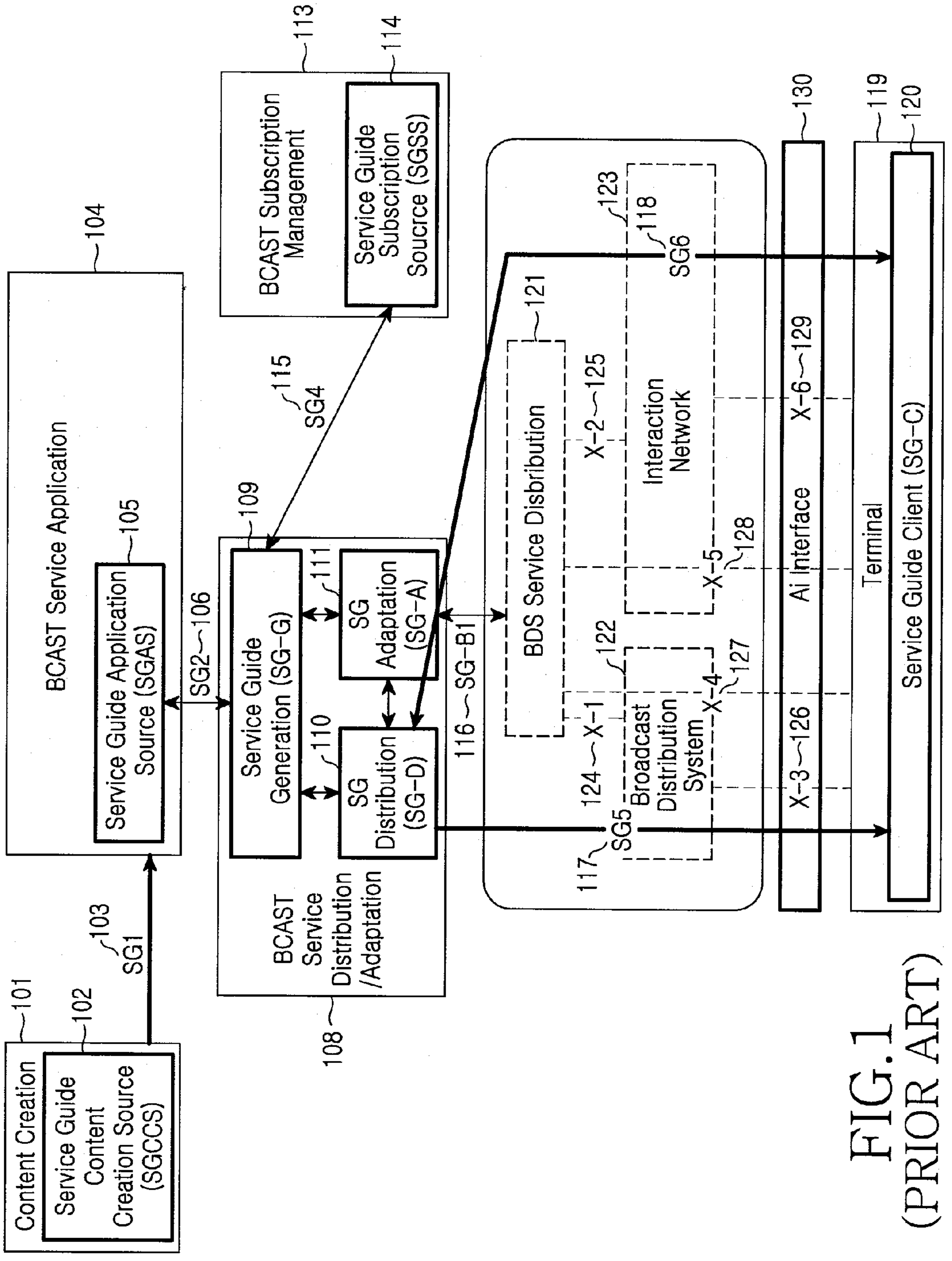
FIG. 1 (PRIOR ART)
FIG. 1 is a diagram illustrating an exemplary architecture of a general mobile broadcast system for delivering a service guide to a mobile terminal.

The service guide of FIG. 2 is generated in the SG-G 109 of FIG. 1, and information (hereinafter provisioning information) of the Provisioning Group 210 is provided from the SGSS 114 of FIG. 1. Detailed information on the service guide can be defined through various elements and attributes for providing detailed contents and values based on the upper data model of FIG. 2. For convenience, although the detailed elements and attributes for each of the fragments of the service guide are not included herein, the detailed elements and attributes do not limit the present invention, and the present invention can be applied to all elements and attributes defined by the need for service guide provisioning for the mobile broadcast service.

Figure 3:
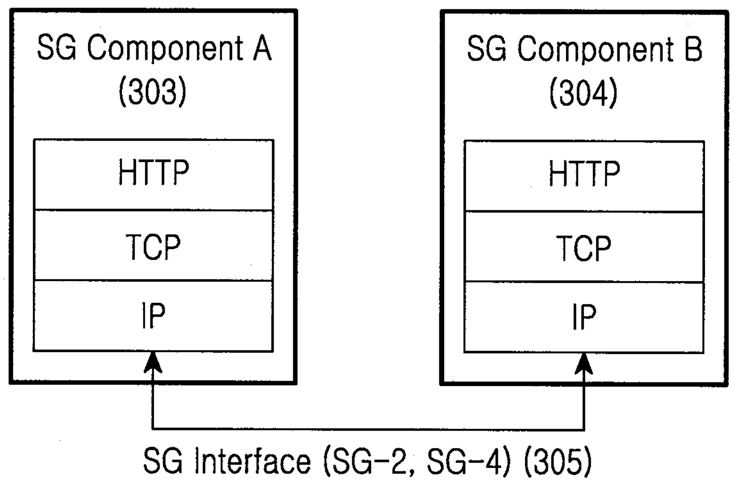
FIG. 3 is a diagram illustrating an interface and a protocol stack for transmitting a service guide in OMA BCAST according to the present invention.

FIG. 3 illustrates a protocol stack for transmitting the service guide data through the service guide structure and interface. FIG. 3 illustrates a protocol stack for delivering a service guide via an SG Interface 305 between an SG Component A 303 and an SG Component B 304. Data is delivered through Hyper Text Transfer Protocol (HTTP) based on Transfer Control Protocol/Internet Protocol (TCP/IP), and provided through HTTP REQUEST and HTTP POST methods defined by HTTP. The SG Interface 305 can be the SG-2 106 and the SG-4 115 defined in FIG. 1. In addition, the same can be applied to the SG-6118, which is an interface between the SG-C 120 in the Terminal 119 and the SG-D 110 in the BSD/A 108. In FIG. 3, if the SG Interface 305 is an SG-2 306, the SG Component A 303 is the SG-G 109 and the SG Component B 304 is the SGAS 105, and this can be inverted according to its application. If the SG Interface 305 is the SG-4 115, the SG Component A 303 is SG-G 109 and the SG Component B 304 is SGSS 114, and this can also be inverted according to its application. The protocol stack of HTTP/TCP/IP can be used even for data transmission via the SG-6118.

Before a description of the present invention is given, a description will now be made of a message scheme table used in the present invention. In Table 3, Name indicates names of elements and attributes constituting the corresponding message. Type indicates a type (Element or Attribute) of the corresponding name. The elements have values E1, E2, E3 and E4, wherein E1 indicates an upper element for the entire message, E2 indicates a sub-element of E1, E3 indicates a sub-element of E2, and E4 indicates a sub-element of E3. An attribute is denoted by A, and A indicates an attribute of the corresponding element. For example, A under E1 indicates an attribute of E1. Category is used for determining whether the corresponding element or attribute is mandatory or optional, and has an M value for the mandatory element or attribute, and an O value for the optional element or attribute. Cardinality indicates relationship between elements, and has values 0, 0 . . . 1, 1, 0 . . . n, 1 . . . n. Herein, 0 means an optional relationship, 1 means mandatory relationship, and n means that a plurality of values can be used. For example, 0 . . . n means that the corresponding message may have no element, or n elements. Description indicates meaning of the corresponding element or attribute, and Data Type indicates a data type for the corresponding element or attribute.

TABLE 3

| Name | Type | Category | Cardinality | Description | Data Type |
|---|---|---|---|---|---|

Figure 4:
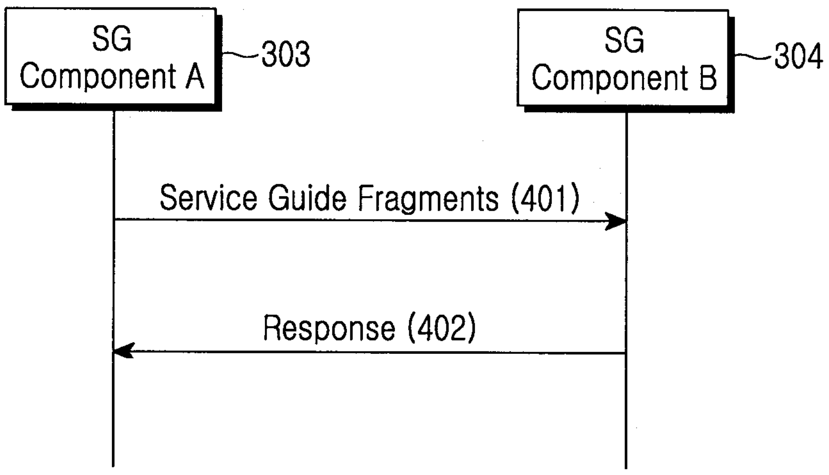
FIG. 4 is a signaling diagram illustrating a process of transmitting a service guide fragment in OMA BCAST according to the present invention.

FIG. 4 is a signaling diagram illustrating a process of transmitting a service guide fragment between the SG Component A 303 and the SG Component B 304 via the SG Interface 305 described in FIG. 3. In FIG. 4, the SG Component A 303 is the SG-G 109, and the SG Component B 304 is the SGAS 105 or the SGSS 114. In step 401, after completing generation of a service guide or service guide fragments, the SG Component A 303 delivers the corresponding data to the SG Component B 304 through an HTTP POST message. In step 402, the SG Component B 304 responds to the receipt. The message of step 401 is shown in Table 4A and Table 4B, and the message of step 402 is shown in Table 5.

TABLE 4A

| Name | Type | Category | Cardinality | Description | Data Type |
|---|---|---|---|---|---|
| SGDelivery | | | | Specifies the message to deliver the generated Service Guide or its Fragments. Contains the Following attributes: SGDeliveryId BSDAAddress Contains the following elements: SGFragments | |

TABLE 4B

| Name | Type | Category | Cardinality | Description | Data Type |
|---|---|---|---|---|---|
| ProvReqId | A | O | 1 | Identifier of ProvReq which is the message for to request Provisioning Information | unsignedInt (32 bits) |
| BSDAAddress | A | O | 1 | BSDA Address to receive the response of this request | anyURI |
| SGFragments | E1 | O | 0 . . . 1 | Contains Service Guide Fragments. The Service Data Model and its XML Schema definition SHALL be used as generic interchange format. | String |

TABLE 5

| Name | Type | Category | Cardinality | Description | Data Type |
|---|---|---|---|---|---|
| SGDeliveryRes | E | | | Specifies the Response message for SGDelivery. Contains the following elements: SGDeliveryId | |
| SGDeliveryId | E1 | N | 0 . . . N | Identifier of SGDelivery Contains the following attributes: Response | unsignedInt (32bits) |
| Response | A | N | 1 | Specifies the Status Code of SGDelivery. | unsignedByte |

Figure 5:
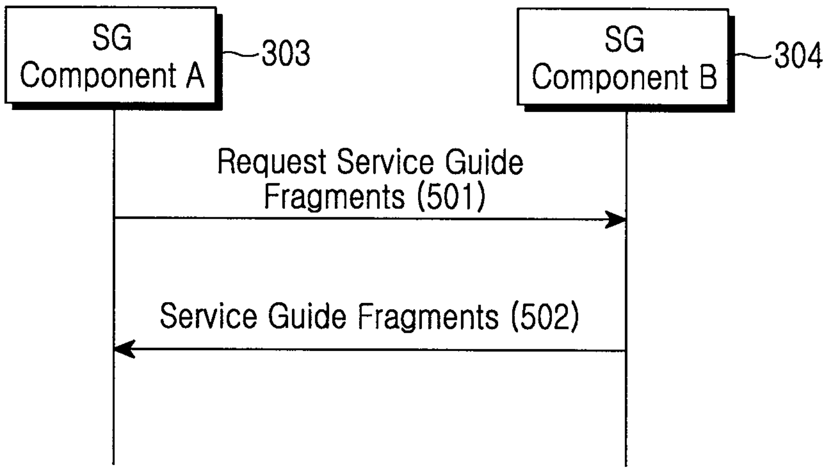
FIG. 5 is a signaling diagram illustrating a process of requesting and transmitting a service guide fragment in OMA BCAST according to the present invention.

FIG. 5 is a signaling diagram illustrating a process of transmitting a service guide fragment between the SG Component A and the SG Component B via the SG Interface described in FIG. 3. In FIG. 5, the SG Component A 303 is the SGAS 105 or the SGSS 114, and the SG Component B 304 is the SG-G 109. In step 501, the SG Component A 303 transmits a service guide or service guide fragments to the SG Component B 304 through an HTTP REQUEST message. If all the generated service guides or service guide fragments are requested, the SG Component A 303 transmits only SGRequestId and EntityAddress, and if fragments related to specific service, content, or PurchaseItem are requested, the SG Component A 303 delivers GlobalServiceId, GlobalContentId, or PurchaseItemId along with a request message. When the corresponding service guide or its fragments are requested, the SG Component B 304 responds to the corresponding request in step 502. If GlobalServiceId, GlobalContentId, or PurchaseItemId is included in the request message, the SG Component B 304 delivers all fragments related to the corresponding content along with a response message. Otherwise, the SG Component B 304 delivers all generated latest service guides or service guide fragments. The message of step 501 is shown in Table 6A and Table 6B, and the message of step 502 is shown in Table 7A and Table 7B.

TABLE 6A

| Name | Type | Category | Cardinality | Description | Data Type |
|---|---|---|---|---|---|
| SGRequest | | | | Specifies the message to request the generated Service Guide or its Fragments. If the specific fragments associated with either Service or Content or PurchaseItem is needed. GlobalServiceID or GlobalContent ID or PurchaseItemId should be included in this Request Message. If not given any sub element, it means all the generated Service Guide its Fragments are requested. Contains the Following attributes: SGRequestId EntityAddress Contains the following elements: GlobalServiceId GlobalContentId PurchaseItemId | |

TABLE 6B

| Name | Type | Category | Cardinality | Description | Data Type |
|---|---|---|---|---|---|
| SGRequestId | A | O | 1 | Identifier of SGRequest | unsignedInt (32 bits) |
| EntityAddress | A | O | 1 | Network Entity Address to receive the response of this request. BSNAddress BSAAddress should be used in this field. | anyURI |
| GlobalServiceId | E1 | O | 0 . . . N | Golbally Unique Service Identifier | anyURI |
| GlobalContentid | E1 | O | 0 . . . N | Globally Unique Content Identifier | anyURI |
| PurchaseItemId | E1 | O | 0 . . . N | ID of PurchaseItem | anyURI |

TABLE 7A

| Name | Type | Category | Cardinality | Description | Data Type |
|---|---|---|---|---|---|
| SGResponse | E | | | Specifies the Response message for SGrequest. Contains the following elements: SGRequestId | |
| SGRequestId | E1 | N | 0 . . . N | Identifier of SGDelivery Contains the following attributes: Response | unsignedInt (32 bits) |

TABLE 7B

| Name | Type | Category | Cardinality | Description | Data Type |
|---|---|---|---|---|---|
| Response | A | N | 1 | Specifies the Status Code of SGDelivery. | unsignedByte |
| SgFragments | E2 | 0 | 0 . . . 1 | Contains service Guide Fragments. The Service Guide Data Model and its XML Schema definition SHALL be used as generic interchange format. If GlobalServiceId or GlobalContentId or PurchaseIten is included in the SGRequest message, all the associated fragments should be included in this field. | String |

With reference to FIGS. 6 to 10, a description will now be made of an exemplary method of requesting price information for a specific purchase item in a Terminal according to the present invention.

Figure 6:
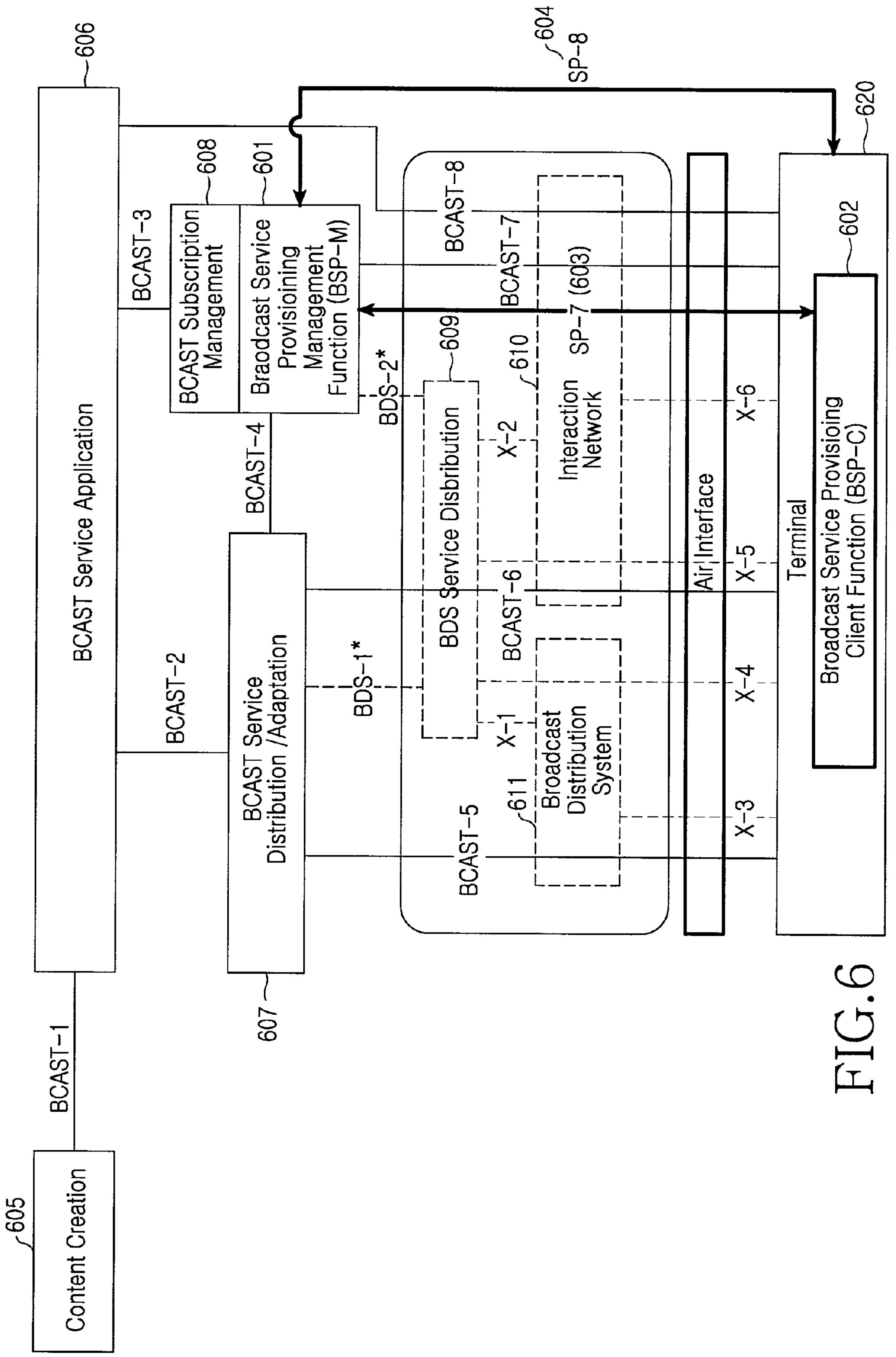
FIG. 6 is a diagram illustrating a mechanism for Service Provisioning in OMA BCAST to which the present invention is applicable.

FIG. 6 is a diagram illustrating a mechanism for Service Provisioning in OMA BCAST.

A Content Creation 605 is a provider of a broadcast service (BCAST service), and the BCAST service can include the conventional audio/video broadcast service, file (music file or data file) download service, and the like.

A BCAST Service Application 606 takes charge of generating BCAST service data by processing data of the BCAST service provided from the Content Creation 605 into a format appropriate for a BCAST network, and generating standardized metadata necessary for a mobile broadcast guide.

A BCAST Service Distribution/Adaptation 607 takes charge of setting up a bearer over which it will transmit the BCAST service data provided from the BCAST Service Application 606, determining a transmission schedule of the BCAST service, and generating a mobile broadcast guide. The BCAST Service Distribution/Adaptation 607 is connected to a Broadcast Distribution System (BDS) 611 capable of providing broadcast service, and an Interaction Network 610 supporting interaction communication.

A BCAST Subscription Management 608 manages subscription information and service provisioning information for receipt of the BCAST service, and device information for a terminal receiving the BCAST service. In particular, the BCAST Subscription Management 608 includes a Broadcast Service Provisioning Management Function (BSP-M) 601. The BSP-M 601 takes charge of providing subscription and purchase information for the service. The BSP-M 601 manages charging of the user according to the subscription information of the user, provides information thereon, and supports billing for the mobile broadcast service. The BSP-M 601 delivers a report in response to a subscription request and a charging and personal information request from the user, via an SP-7 603 or an SP-8 604.

A BDS Service Distribution 609 takes charge of distributing all received BCAST services through a broadcast channel or an interaction channel, and is an entity, the presence of which depends on a type of the BDS 611. The BDS 611 is a network for transmitting the BCAST service, and can be a broadcast network for, for example, DVB-H, 3GPP MBMS, and 3GPP2 BCMCS.

The Interaction Network 610 transmits the BCAST service on a point-to-point basis, or interactively exchanges control information and additional information related to the receipt of the BCAST service, and can be, for example, the existing cellular network.

A Terminal 620 is a terminal capable of receiving the BCAST service, and has a function capable of connecting with the cellular network according to terminal capability. The Terminal 620 is assumed to be a terminal capable connecting with the cellular network.

A Broadcast Service Provisioning Client Function (BSP-C) 602 in the Terminal 620 manages reporting on subscription to and use of the BCAST service. The BSP-C 602 can extract provisioning information for subscription and purchase from the service guide, or can filter the information when necessary.

A Service Provisioning (SP) in FIG. 6 manages subscription to the BCAST service and purchase on the subscribed service. In addition, the SP can provide addition information related to the purchase. A description of the SP-7 603 and the SP-8 604 is given in Table 8.

TABLE 8

| Interface | Reference Point | Usage |
|---|---|---|
| SP-7 | BCAST-7 | Delivery of messages used for a subscription such as subscription request user and response from BCAST Subscription Management.<br>Delivery of payment information |
| SP-8 | Out of band | The End User subscribes and purchases the services through the out-of-band interfaces. It's out of scope of OMA BCAST. |

Figure 7:
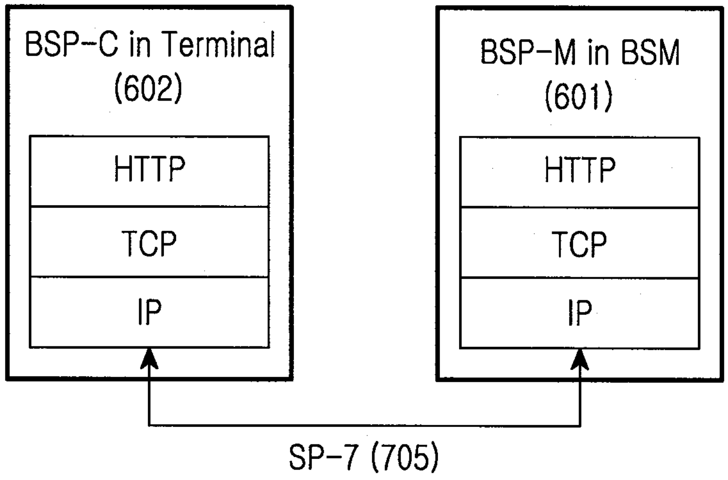
FIG. 7 is a diagram illustrating a protocol stack used for transmitting service provisioning information in OMA BCAST according to the present invention.

FIG. 7 illustrates a protocol stack used for requesting or delivering information via an SP-7 interface, which is an interaction channel for interaction communication between a BSP-M and a BSP-C. FIG. 7 shows a protocol stack for transmitting data via an SP-7 interface 705 between the BSP-C 602 and the BSP-M 601. A request or delivery of information is delivered through HTTP in TCP/IP, and an HTTP Request is used therefor. If needed, all other schemes supported by HTTP POST or HTTP can be used.

Figure 8:
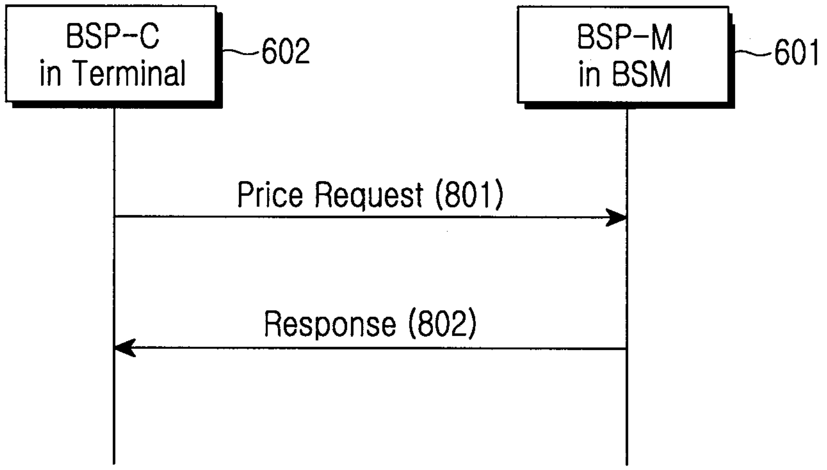
FIG. 8 is a signaling diagram for servicing provisioning in OMA BCAST according to the present invention.

FIG. 8 is a signaling diagram for the case where a BSP-C sends a request for price information to a BSP-M. A user detects service/content/schedule from a service guide received at a Terminal, and determines a purchase item related thereto. In step 801, if no price information for the determined purchase item is included, the BSP-C 602 of the user sends a price request for the corresponding purchase item to the BSP-M 601, and a request message therefor is shown in Table 9A and Table 9B. In step 802, the BSP-M 601 delivers price information to the BSP-C 602 in response to the request. Only the price information can be simply provided, or the associated service guide fragments can be provided together. A response message of step 802 for the case where the BSP-M 601 sends price information in acceptance of the request message is shown in Table 10, and a response message for the case where the BSP-M 601 rejects the request message is shown in Table 11.

TABLE 9A

| Name | Type | Category | Cardinality | Description | Data Type |
|---|---|---|---|---|---|
| Interface Version | E | M | 1 | Version of this Interface supported by the terminal<br>The interface version number described by this specification is 1. | Integer |
| UserID | E | O | 1 | The user identity known to the BSM.<br>Note: For roaming case, this element is mandatory otherwise this element is optional. | String |
| DeviceID | E | O | 1 | A unique device identification known to the BSM (e.g. the International Mobile Equipment Identity, Identity,IMEI). | String |

TABLE 9A-continued

| Name | Type | Category | Cardinality | Description | Data Type |
|---|---|---|---|---|---|
| BsdaID | E | O | 1 | Globally coordinated ID of the BSD/A, BSM can retrieve service information from BSD/A.. Note: For roaming case, this element is mandatory otherwise this element is optional. | anyURI |

TABLE 9B

| Name | Type | Category | Cardinality | Description | Data Type |
|---|---|---|---|---|---|
| PurchaseItemID | E | M | 1 . . . N | Identifiers of the purchase items of which the user wants to know the price. | anyURI |
| RequestID | E | 0 | 1 | Identifier for the Price Information request message. | Integer |
| Authentication | E | O | 1 | The message authentication, created as described section. | Base64-encoded binary |

TABLE 10

| Name | Type | Category | Cardinality | Description | Data Type |
|---|---|---|---|---|---|
| Global Status Code | E | N | 1 | The overall outcome of the request, according to the return codes | Integer |
| RequestID | E | o | 1 | Identifier for the corresponding Service Guide request message. | Integer |
| Purchase ITEM ID | E | N | 1 . . . N | IDs of Purchase Item that a user wants to know price. | AnyURI |
| Price_info | E1 | N | 1 | Price information of Purchase Item that a user wants to know the price. | String |
| Service Guide Fragment | E | O | 1 . . . N | Service guide fragments containing information for the requested purchase items. The format is specified in [BCAST-SG] | Complex Type |
| Authentication | E | O | 1 | The message authentication, created as described in section. | Base64-encoded binary |

TABLE 11

| Name | Type | Category | Cardinality | Description | Data Type |
|---|---|---|---|---|---|
| Global Status Code | E | N | 1 | The overall outcome of the request, according to the return codes defined in Table 2. | Integer |
| ItemWise Status Code | E | N | 1 . . . N | A list of item-specific error codes (see Table 2) | Integer |
| Purchase ITEM ID | A | N | 1 | For each status code, the ID of the purchase item to which the particular error is related. | AnyURI |
| RequestID | E | O | 1 | Identifier for the corresponding Price Information request message. | Integer |
| Authentication | E | O | 1 | The message authentication, created as described in section. | Base64-encoded binary |

Figure 9:
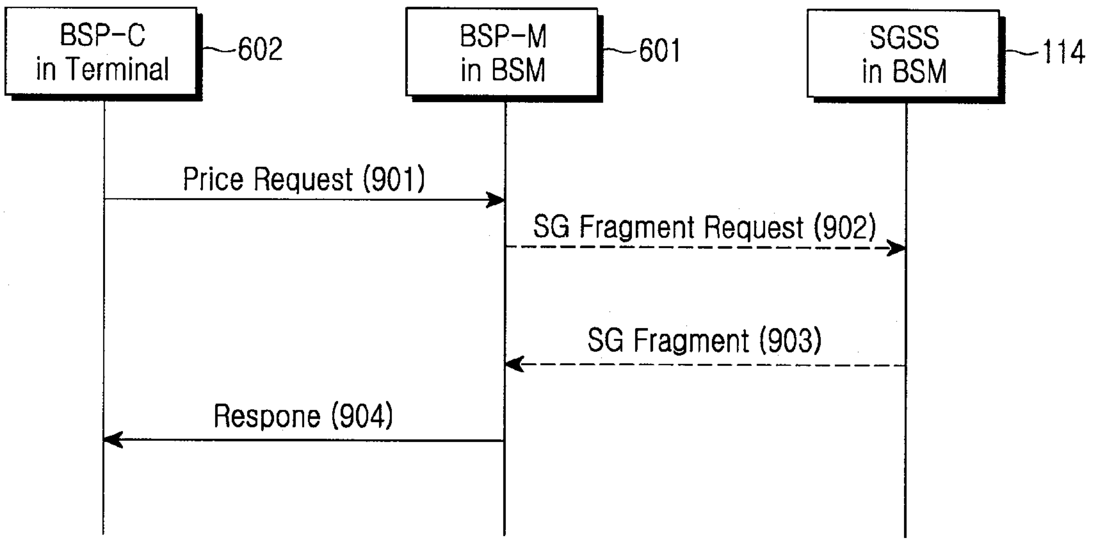
FIG. 9 is a signaling diagram illustrating a process of delivering information in a BSM in response to a price request from a Terminal according to the present invention.

FIG. 9 is a signaling diagram illustrating a process of delivering a response message in response to the price request from a BSP-C in the case where a BSM has a service guide or service guide fragments. A request message in step 901 and a response message in step 904 are shown in Table 9A, Table 9B, Table 10, and Table 11 described in FIG. 8.

In step 901, the BSP-C 602 sends a price request for the purchase item to the BSP-M 601. When only the price information Price_info is provided, the BSP-M 601 transmits the corresponding information to the BSP-C 602 in step 904. In the case where there is a need to transmit service guide fragments related to the purchase item to the Terminal, if the BSP-M 601 sends in step 902 an SG Fragment Request to the SGSS 114 in the BSM, the SGSS 114 delivers the associated SF Fragment to the BSP-M 601 in step 903. Then the BSP-M 601 delivers the corresponding fragments along with a response message in step 904.

Figure 10:
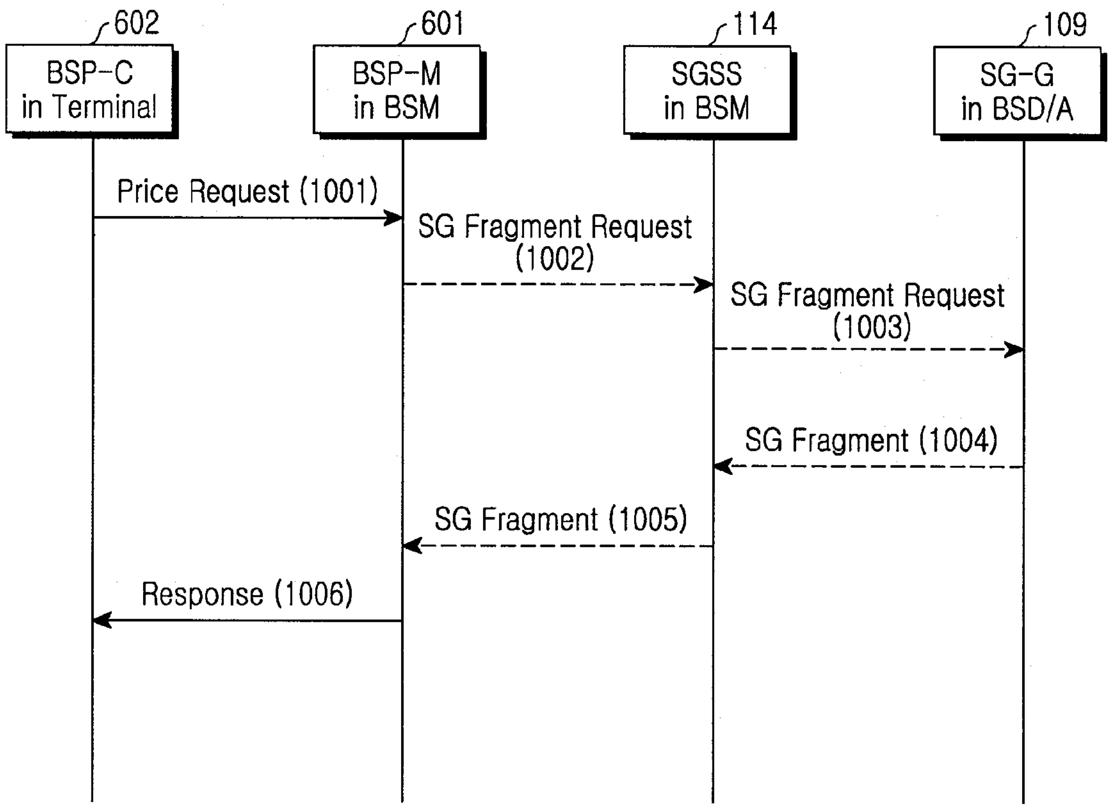
FIG. 10 is a signaling diagram illustrating a process of providing informant delivered from a BSD/A to a Terminal by a BSM in response to a price request from the Terminal according to the present invention.

FIG. 10 is a signaling diagram illustrating a process of sending a request for a corresponding fragment to a BSD/A and providing the corresponding information to a Terminal if a BSM has no information identical to the requested purchase item or has no service guide or service guide fragment in the case where there is a need to deliver an SG fragment in response to a price request.

A request message in step 1001 and a response message in step 1006 are shown in Table 9A, Table 9B, Table 10, and Table 11 described in FIG. 8, and messages of steps 1003 and 1004 are shown in Table 6A, Table 6B, Table 7A and Table 7B described in FIG. 6. The BSP-C 602 in the Terminal sends a price request to the BSP-M 601 in step 1001, and the BSP-M 601 sends an SG Fragment Request for the corresponding purchase item to the SGSS 114 in the same BSM in step 1002. If there is no content identical to PurchaseItemId for the requested purchase item or the SGSS does not have the latest service guide or service guide fragments, the SGSS 114 in the BSM sends an SG Fragment Request for the corresponding fragment to the SG-G 109 in step 1003. The SGSS 114 can request all of the generated service guides or service guide fragments. In step 1004, the SG-G 109 delivers the requested SG Fragment to the SGSS 114 in the BSM. The SGSS 114 in the BSM delivers the SG Fragment to the BSP-M 601 in step 1005, and finally provides the SG Fragment to the Terminal in step 1006.

As can be understood from the foregoing description, in order to generate a service guide in the mobile broadcast system, the SG-G receives sources necessary for the generation of the service guide from the CC, the BSA and the BSM. With use of the provided information, the SG-G generates the final service guide based on the data model described in FIG. 2. Although information on the service guide is a response to a request for service guide-related information, sent from the Terminal to the BSM, the BSA needs final information on the service guide generated in the same way by the BSM and the BSA, as basic information for generation of charging information for the service. For this, the BSD/A can provide a service guide generated therein to the BSM and the BSA, or the BSM or the BSA can send a request for service guide information to the BSD/A when necessary, and receive the corresponding information therefrom.

In addition, in a service provisioning process, if the BSM needs to provide service guide fragments for associated purchase information upon receipt of a request for price information from the Terminal, the BSM can directly transmit the corresponding information to the Terminal, or receive the corresponding information provided from the BSD/A and transmit the received information to the Terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for requesting a service guide or a service guide fragment in a mobile broadcast system supporting a mobile broadcast service, the method comprising:

determining a purchase item among subscribed services using a received service guide;

sending, by a Broadcast Service Provisioning Client Function (BSP-C), to a Broadcast Service Provisioning Management Function (BSP-M) a request message for requesting price information related to the purchase item if there is no price information for the determined purchase item;

receiving, by the BSP-C, a response message in response to the request message from the BSP-M, sending, by the BSP-M, the request message to a Service Guide Subscription Source (SGSS) in a same Broadcast Subscription Management (BSM) if the BSM does not have information identical to the purchase item; and transmitting, by the SGSS, a corresponding response message to the BSP-M, wherein the request message includes a UserID for user identity, a DeviceID for unique device identification, a Broadcast Service Distribution/Adaptation (BSD/A) ID for a coordinated ID of the BSD/A, a PurchaseItemID for purchase item identification, and a RequestID for Price Information request message identification;

wherein the response message includes a RequestID for the request message identification, a Purchase ITEM ID for requested Purchase Item identification, Price information of requested Purchase Item, and Service guide fragments containing information for the requested Purchase Items; and wherein the SGSS and a BSA (BCAST Service Application) have final information on the service guide, and generate the final information in a same manner.

2. The method of claim 1, wherein the request message and the response message between the BSP-C and the BSP-M are transmitted via one of a Service Provisioning (SP)-7 interface and a SP-8 interface.

3. The method of claim 1, wherein the request message and the response message between the BSP-C and the BSP-M are transmitted via one of a Service Provisioning (SP)-7 interface and a SP-8 interface.

4. The method of claim 1, further comprising:

sending, by a Service Guide Subscription Source (SGSS), the request message to a Service Guide Generation (SG-G) if there is no content identical to the PurchaseItemId for the requested purchase item at the SGSS or if the SGSS does not have a latest service guide or service guide fragments;

transmitting, by the SG-G, a generated service guide or service guide fragment corresponding to the requested service guide or service guide fragment to the SGSS;

transmitting, by the SGSS, the requested service guide or service guide fragment to the BSP-M, and transmitting, by the BSP-M, the requested service guide or service guide fragment to the BSP-C.

5. The method of claim 4, wherein a request message for requesting the service guide fragment between the BSP-C and the BSP-M, and a response message to the service information request are transmitted via one of a Service Provisioning (SP)-7 interface and a SP-8 interface.

6. A system for requesting a service guide or a service guide fragment in a mobile broadcast system supporting a mobile broadcast service, the system comprising:

a Broadcast Service Provisioning Client Function (BSP-C), in a terminal, for determining a purchase item among subscribed services using a received service guide, and sending a request message for requesting price information related to the purchase item to a Broadcast Service Provisioning Management Function (BSP-M) if there is no price information for the determined purchase item;

the BSP-M for sending the request message to a Service Guide Subscription Source (SGSS) in a same Broadcast Subscription Management (BSM) if the BSM has not information identical to the purchase item; and the SGSS for transmitting the corresponding response message to the BSP-M, wherein the BSP-M transmits a response message in response to the request message to the BSP-C;

wherein the request message includes a UserID for user identity, a DeviceID for a unique device identification, a Broadcast Service Distribution/Adaptation (BSD/A) ID for a coordinated ID of the BSD/A, a PurchaseItemID for purchase items identification, and a RequestID for Price Information request message identification;

wherein the response message includes a RequestID for the request message identification, a Purchase ITEM ID for requested Purchase Item identification, Price information of requested Purchase Item, and Service guide fragments containing information for the requested purchase items, and wherein the SGSS and a BSA (BCAST Service Application) have final information on the service guide, and generate the final information in a same manner.

7. The system of claim 6, wherein the request message and the response message between the BSP-C and the BSP-M are transmitted via one of a Service Provisioning (SP)-7 interface and a SP-8 interface.

8. The system of claim 6, wherein the request message and the response message between the BSP-C and the BSP-M, and a response message to a service information request are transmitted via one of a Service Provisioning (SP)-7 interface and a SP-8 interface.

9. The system of claim 6, further comprising: the SGSS for sending the request message to a Service Guide Generation (SG-G) if there is no content identical to the PurchaseItemId for the requested purchase item at the SGSS or the SGSS does not have the latest service guide or service guide fragments, and transmitting the requested service guide or service guide fragment to the BSP=M; and the SG-G for transmitting the generated service guide or service guide fragment corresponding to the requested service guide or service guide fragment to the SGSS.

10. The system of claim 9, wherein a request message for requesting the service guide fragment between the BSP-C and the BSP-M, and a response message to the service information request are transmitted via one of a Service Provisioning (SP)-7 interface and a SP-8 interface.

* * * * *